(12) United States Patent
Orr et al.

(10) Patent No.: US 8,238,337 B1
(45) Date of Patent: Aug. 7, 2012

(54) HYBRID MULTICAST SWITCH EMPLOYING NETWORK-LAYER ROUTING

(75) Inventors: Michael Orr, Sunnyvale, CA (US); Alon Harel, Ramat-Gan (IL); Eugene Zetserov, Holon (IL)

(73) Assignees: Marvell Isreal Ltd. (M.I.S.L.), Tel Aviv (IL); Marvell International Ltd., Hamilton (BM)

( * ) Notice: Subject to any disclaimer, the term of this patent is extended or adjusted under 35 U.S.C. 154(b) by 363 days.

(21) Appl. No.: 12/062,036

(22) Filed: Apr. 3, 2008

Related U.S. Application Data (60) Provisional application No. 60/909,801, filed on Apr. 3, 2007.

(51) Int. Cl.
  *H04L 12/28* (2006.01)
(52) U.S. Cl. .................................. 370/390; 370/395.53
(58) Field of Classification Search ........................ None
  See application file for complete search history.

(56) References Cited

U.S. PATENT DOCUMENTS

| | | | |
|---|---|---|---|
| 7,075,928 B1 * | 7/2006 | Branth et al. ................. | 370/390 |
| 7,719,958 B1 * | 5/2010 | Azimi et al. .................. | 370/220 |
| 2005/0091313 A1 * | 4/2005 | Zhou et al. .................... | 709/204 |
| 2006/0149965 A1 * | 7/2006 | Sharma .......................... | 713/163 |
| 2007/0127459 A1 * | 6/2007 | Lo et al. ........................ | 370/389 |
| 2007/0140107 A1 * | 6/2007 | Eckert et al. ................... | 370/216 |
| 2007/0214359 A1 * | 9/2007 | Williamson ................... | 713/163 |
| 2008/0175239 A1 * | 7/2008 | Sistanizadeh et al. ........ | 370/390 |
| 2010/0228879 A1 * | 9/2010 | Wiget et al. ................... | 709/238 |

\* cited by examiner

*Primary Examiner* — Anh-Vu H Ly
*Assistant Examiner* — Tito Pham (57) ABSTRACT

A switch having first, second, and third ports receives a multicast join message into the first port on a first VLAN, wherein the first and second ports are associated with the first VLAN, the second and third ports are associated with a second VLAN, and the first, second, and third ports are associated with a multicast VLAN, and wherein the multicast join message represents a first request to join a multicast group; creates an association between the multicast group and the ports associated with the multicast VLAN based on the multicast join message; transmits a network-layer routing protocol message from the second port, wherein the network-layer routing protocol message represents a second request to join the multicast group; receives a multicast packet for the multicast group into the second port; and transmits the multicast packet on the multicast VLAN based on the association.

30 Claims, 4 Drawing Sheets

HYBRID MULTICAST SWITCH EMPLOYING NETWORK-LAYER ROUTING

CROSS-REFERENCE TO RELATED APPLICATIONS

This application claims the benefit of U.S. Provisional Patent Application Ser. No. 60/909,801 filed Apr. 3, 2007, the disclosure thereof incorporated by reference herein in its entirety.

BACKGROUND

The present disclosure relates generally to data communications. More particularly, the present disclosure relates to data communication switches.

As broadband data communication networks proliferate, video providers are increasingly turning to such networks for delivery of content to customers. For example, systems have been developed to deliver digital television to customers over these networks. These systems can provide live TV as well as Video on Demand (VOD).

VOD allows a customer to receive a program from the beginning by streaming the program data to the customer at a time of the customer's choosing. Thus with VOD, the entire program must be replicated for each customer, consuming considerable bandwidth.

With live TV, the customer joins the program in progress. Because each program is delivered to customers at substantially the same time, technologies such as multicast delivery can be used to reduce the number of copies of the program traversing the network, thereby conserving considerable bandwidth.

Figure 1:
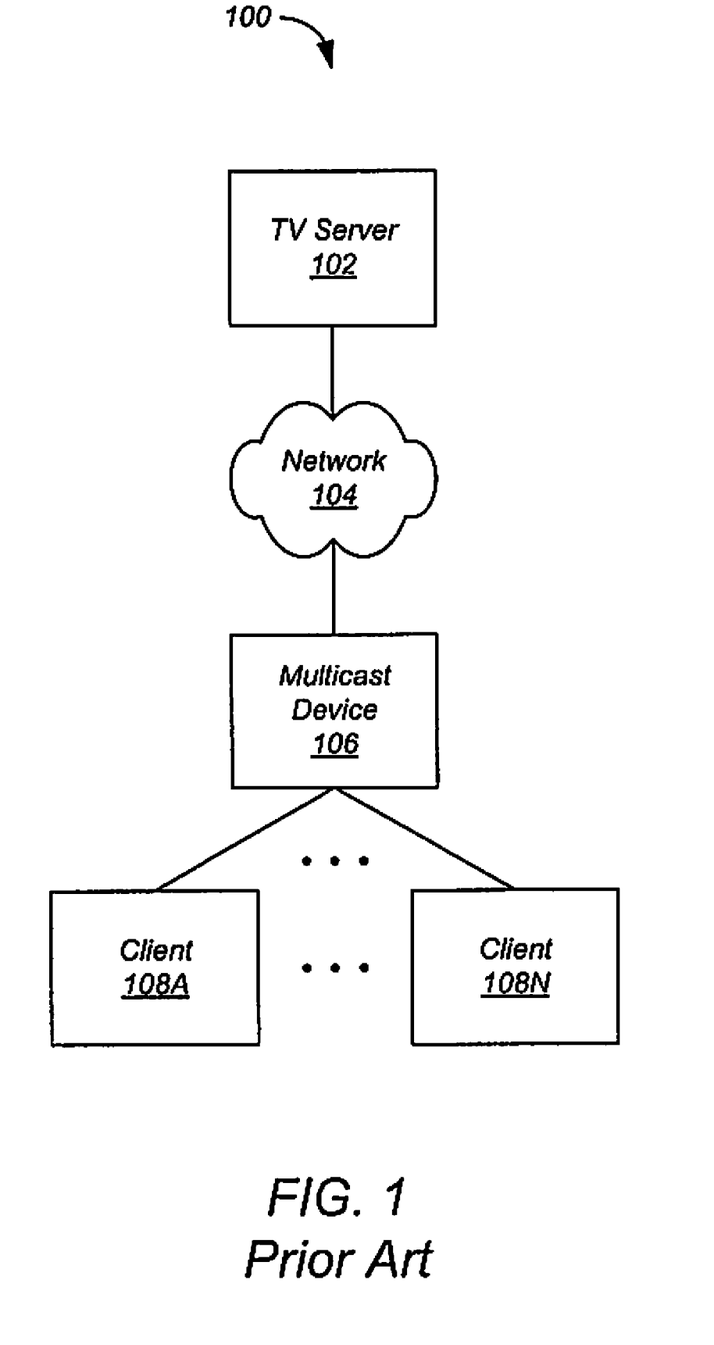
FIG. 1 shows a prior art live TV distribution system.

FIG. 1 shows a prior art live TV distribution system 100. In system 100, a TV server 102 provides multiple TV channels to a network 104, and a multicast device 106 provides the TV channels to clients 108A-N on request. In terms of the Open Systems Interconnection (OSI) Basic Reference Model, multicast device 106 can be a layer-2 (data link layer) device or a layer-3 (network layer) device. System 100 must accomplish three tasks: (A) determine which channels have been requested by clients 108, (B) notify upstream nodes in network 104 of the requested channels, and (C) deliver each channel, which arrives in the form of multicast packets from network 104, to the appropriate clients 108.

Each channel is assigned a multicast group. When a customer selects a channel, his client 108 sends a message to multicast device 106 requesting to join the corresponding multicast group. The message is usually implemented as an Internet Group Management Protocol (IGMP) join message.

When implemented as a layer-3 device, multicast device 106 accepts the IGMP message (task A) and then notifies network 104 of the selected multicast group using multicast routing protocols (task B). In response, network 104 determines an efficient path for delivery of the multicast packets in that multicast group to multicast device 106.

When implemented as a layer-2 device, multicast device 106 simply forwards the IGMP message to network 104, where a layer-3 device accepts the IGMP message and notifies upstream nodes in network 104 (task B). Multicast device 106 also "snoops" the IGMP message to determine the client 108 and multicast group indicated by the message (task A).

For task C, when implemented as a layer-3 device, multicast device 106 includes a hardware replication engine that makes a copy of each received multicast packet for each client 108 that has requested to join the multicast group to which the packet belongs. But when implemented as a layer-2 device, multicast device 106 uses the layer-2 multicast address in each multicast packet as a broadcast address, so that the packet is sent to all ports of the virtual local-area network (VLAN) on which the packet arrived. Therefore, either all clients 108 who request a particular multicast group must be members of the same VLAN, or if the clients 108 are in different VLANs, multicast device 106 must make a copy of each packet for each VLAN containing a client requesting the multicast group.

Because duplication in each VLAN wastes bandwidth, and for commercial and security reasons clients 108 in many cases cannot share a VLAN, one solution is to implement multicast device 106 as a layer-3 device, which as noted above, includes a hardware replication engine that can replicate a single incoming multicast stream into each client's VLAN. However, a layer-3 device is often seen as too expensive, in terms of both cost and management overhead.

A common solution is to implement multicast device 106 as a layer-2 device that can enroll clients 108 in a "multicast" VLAN used only for multicast distribution. All multicast streams are sent in the "multicast" VLAN towards clients 108, but clients 108 are not allowed to use the multicast VLAN for any other purpose. Instead, each client 108 uses additional, separate VLANs for regular traffic. In this solution, packets are confined to a single VLAN as required. However, as a layer-2 device, multicast device 106 simply passes IGMP messages upstream, where they can be broadcast, wasting additional bandwidth.

SUMMARY

In general, in one aspect, an embodiment features a method for a switch having a plurality of ports including a first port, a second port, and a third port, the method comprising: receiving a multicast join message into the first port on a first virtual local-area network (VLAN), wherein the first and second ports are associated with the first VLAN, the second and third ports are associated with a second VLAN, and the first, second, and third ports are associated with a multicast VLAN, and wherein the multicast join message represents a first request to join a multicast group; creating an association between the multicast group and the ports associated with the multicast VLAN based on the multicast join message; transmitting a network-layer routing protocol message from the second port, wherein the network-layer routing protocol message represents a second request to join the multicast group; receiving a multicast packet for the multicast group into the second port; and transmitting the multicast packet on the multicast VLAN based on the association.

Embodiments of the method can include one or more of the following features. Some embodiments comprise removing the third port from the association when no device attached to the third port is associated with the multicast group. Some embodiments comprise dropping traffic received into the second and third ports on the multicast VLAN. In some embodiments, the network-layer routing protocol is selected from the group consisting of: Protocol Independent Multicast (PIM); and Distance Vector Multicast Routing Protocol (DVMRP). In some embodiments, the multicast join message is an Internet Group Management Protocol (JUMP) message.

In general, in one aspect, an embodiment features a computer program, executable on a processor, for a switch having a plurality of ports including a first port, a second port, and a third port, wherein the first and second ports are associated with a first virtual local-area network (VLAN), the second and third ports are associated with a second VLAN, and the first, second, and third ports are associated with a multicast VLAN, the computer program comprising: instructions for creating an association between a multicast group and the ports associated with the multicast VLAN based on a multicast join message received into the first port on the first VLAN, wherein the multicast join message represents a first request to join the multicast group; instructions for causing transmission of a network-layer routing protocol message from the second port, wherein the network-layer routing protocol message represents a second request to join the multicast group, and wherein a multicast packet for the multicast group is received into the second port; and instructions for causing transmission of the multicast packet on the multicast VLAN based on the association.

Embodiments of the computer program can include one or more of the following features. Some embodiments comprise instructions for removing the third port from the association when no device attached to the third port is associated with the multicast group. Some embodiments comprise instructions for causing traffic received into the second and third ports on the multicast VLAN to be dropped. In some embodiments, the network-layer routing protocol is selected from the group consisting of: Protocol Independent Multicast (PIM); and Distance Vector Multicast Routing Protocol (DVMRP). In some embodiments, the multicast join message is an Internet Group Management Protocol (IGMP) message.

In general, in one aspect, an embodiment features an apparatus for managing a switch having a plurality of ports including a first port, a second port, and a third port, wherein the first and second ports are associated with a first virtual local-area network (VLAN), the second and third ports are associated with a second VLAN, and the first, second, and third ports are associated with a multicast VLAN, the apparatus comprising: an association module adapted to create an association between a multicast group and the ports associated with the multicast VLAN based on a multicast join message received into the first port on the first VLAN, wherein the multicast join message represents a first request to join the multicast group; a network-layer routing protocol module adapted to transmit a network-layer routing protocol message from the second port, wherein the network-layer routing protocol message represents a second request to join the multicast group; and a multicast distribution module adapted to cause transmission on the multicast VLAN, based on the association, of multicast packets received for the multicast group into the second port.

Embodiments of the apparatus can include one or more of the following features. In some embodiments, the association module removes the third port from the association when no device attached to the third port is associated with the multicast group. Some embodiments comprise a multicast VLAN module adapted to cause traffic received into the second and third ports on the multicast VLAN to be dropped. In some embodiments, the network-layer routing protocol is selected from the group consisting of: Protocol Independent Multicast (PIM); and Distance Vector Multicast Routing Protocol (DVMRP). In some embodiments, the multicast join message is an Internet Group Management Protocol (IGMP) message.

In general, in one aspect, an embodiment features an apparatus for a switch having a plurality of ports including a first port, a second port, and a third port, the apparatus comprising: means for receiving a multicast join message into the first port on a first virtual local-area network (VLAN), wherein the first and second ports are associated with the first VLAN, the second and third ports are associated with a second VLAN, and the first, second, and third ports are associated with a multicast VLAN, and wherein the multicast join message represents a first request to join a multicast group; means for creating an association between the multicast group and the ports associated with the multicast VLAN based on the multicast join message; means for transmitting a network-layer routing protocol message from the second port, wherein the network-layer routing protocol message represents a second request to join the multicast group; means for receiving a multicast packet for the multicast group into the second port; and means for transmitting the multicast packet on the multicast VLAN based on the association.

Embodiments of the apparatus can include one or more of the following features. Some embodiments comprise means for removing the third port from the association when no device attached to the third port is associated with the multicast group. Some embodiments comprise means for dropping traffic received into the second and third ports on the multicast VLAN. In some embodiments, the network-layer routing protocol is selected from the group consisting of: Protocol Independent Multicast (PIM); and Distance Vector Multicast Routing Protocol (DVMRP). In some embodiments, the multicast join message is an Internet Group Management Protocol (IGMP) message.

In general, in one aspect, an embodiment features a method for a switch having a plurality of ports including a first port, a second port, and a third port, the method comprising: receiving a first multicast join message into the first port on a first virtual local-area network (VLAN), wherein the first and second ports are associated with the first VLAN, the second and third ports are associated with a second VLAN, and the first, second, and third ports are associated with a multicast VLAN, and wherein the first multicast join message represents a first request to join a multicast group; creating an association between the multicast group and the ports associated with the multicast VLAN based on the first multicast join message; transmitting a second multicast join message from the second port when no device attached to the third port is associated with the multicast group, wherein the second multicast join message represents a second request to join the multicast group; receiving a multicast packet for the multicast group into the second port; and transmitting the multicast packet on the multicast VLAN based on the association.

Embodiments of the method can include one or more of the following features. Some embodiments comprise removing the third port from the association when no device attached to the third port is associated with the multicast group. Some embodiments comprise dropping traffic received into the second and third ports on the multicast VLAN. In some embodiments, the first and second multicast join messages are Internet Group Management Protocol (IGMP) messages.

In general, in one aspect, an embodiment features a computer program, executable on a processor, for a switch having a plurality of ports including a first port, a second port, and a third port, wherein the first and second ports are associated with a first virtual local-area network (VLAN), the second and third ports are associated with a second VLAN, and the first, second, and third ports are associated with a multicast VLAN, the computer program comprising: instructions for creating an association between a multicast group and the ports associated with the multicast VLAN based on a first multicast join message received into the first port on the first VLAN, wherein the first multicast join message represents a first request to join the multicast group; instructions for causing transmission of a second multicast join message from the second port when no device attached to the third port is associated with the multicast group, wherein the second multicast join message represents a second request to join the multicast group, and wherein a multicast packet for the multicast group is received into the second port; and instructions for causing transmission of the multicast packet on the multicast VLAN based on the association.

Embodiments of the computer program can include one or more of the following features. Some embodiments comprise instructions for removing the third port from the association when no device attached to the third port is associated with to the multicast group. Some embodiments comprise instructions for causing traffic received into the second and third ports on the multicast VLAN to be dropped. In some embodiments, the first and second multicast join messages are Internet Group Management Protocol (IGMP) messages.

In general, in one aspect, an embodiment features an apparatus for managing a switch having a plurality of ports including a first port, a second port, and a third port, wherein the first and second ports are associated with a first virtual local-area network (VLAN), the second and third ports are associated with a second VLAN, and the first, second, and third ports are associated with a multicast VLAN, the apparatus comprising: an association module adapted to create an association between a multicast group and the ports associated with to the multicast VLAN based on a first multicast join message received into the first port on the first VLAN, wherein the first multicast join message represents a first request to join the multicast group; a multicast proxy module adapted to transmit a second multicast join message from the second port, wherein the second multicast join message represents a second request to join the multicast group; and a multicast distribution module adapted to cause transmission on the multicast VLAN, based on the association, of multicast packets received for the multicast group into the second port.

Embodiments of the apparatus can include one or more of the following features. In some embodiments, the association module removes the third port from the association when no device attached to the third port is associated with the multicast group. Some embodiments comprise a multicast VLAN module adapted to cause traffic received into the second and third ports on the multicast VLAN to be dropped. In some embodiments, the first and second multicast join messages are Internet Group Management Protocol (IGMP) messages.

In general, in one aspect, an embodiment features an apparatus for a switch having a plurality of ports including a first port, a second port, and a third port, the apparatus comprising: means for receiving a first multicast join message into the first port on a first virtual local-area network (VLAN), wherein the first and second ports are associated with the first VLAN, the second and third ports are associated with a second VLAN, and the first, second, and third ports are associated with a multicast VLAN, and wherein the first multicast join message represents a first request to join a multicast group; means for creating an association between the multicast group and the ports associated with the multicast VLAN based on the first multicast join message; means for transmitting a second multicast join message from the second port when no device attached to the third port is associated with the multicast group, wherein the second multicast join message represents a second request to join the multicast group; means for receiving a multicast packet for the multicast group into the second port; and means for transmitting the multicast packet on the multicast VLAN based on the association.

Embodiments of the apparatus can include one or more of the following features. Some embodiments comprise means for removing the third port from the association when no device attached to the third port is associated with the multicast group. Some embodiments comprise means for dropping traffic received into the second and third ports on the multicast VLAN. In some embodiments, the first and second multicast join messages are Internet Group Management Protocol (IGMP) messages.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Figure 2:
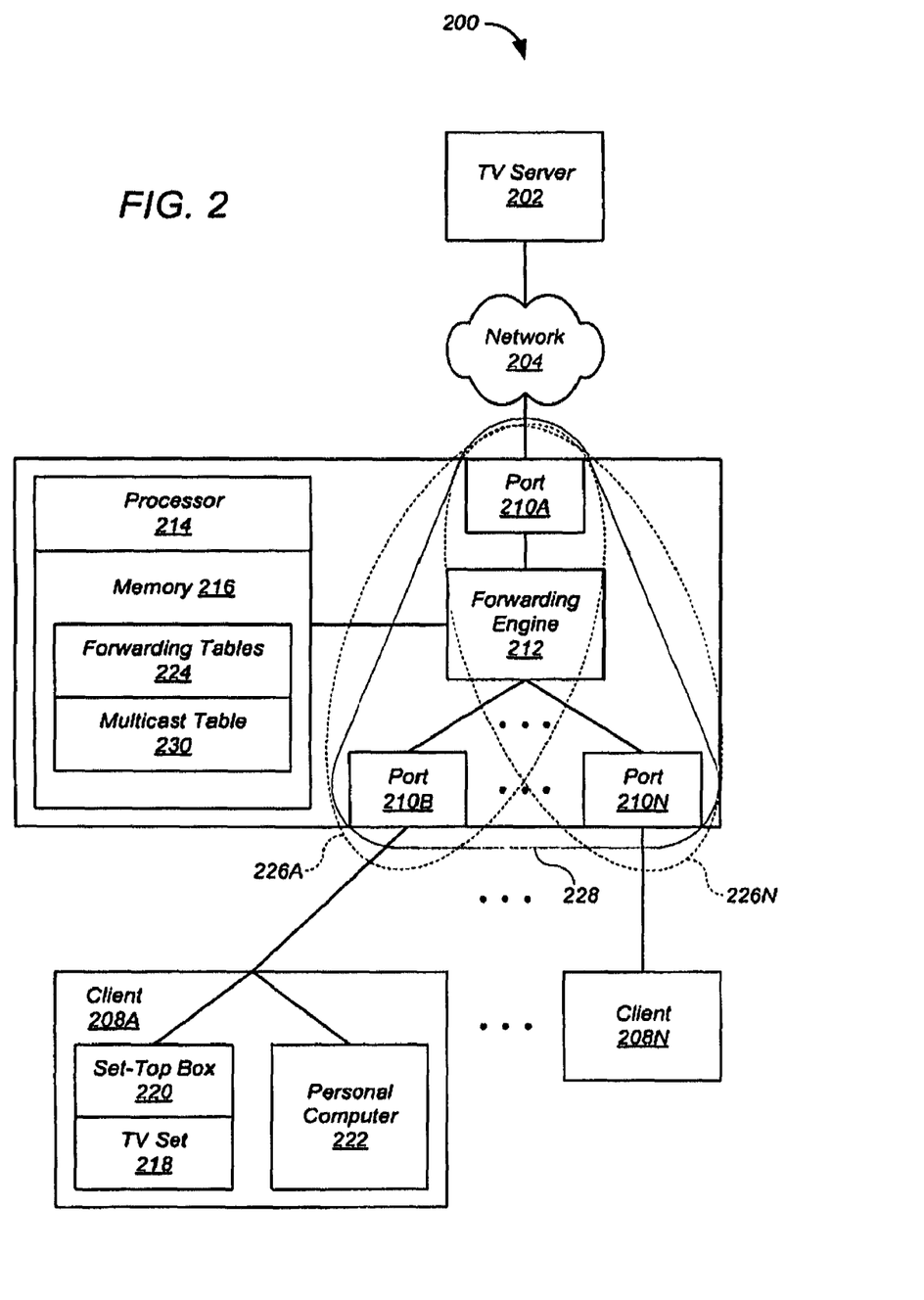
FIG. 2 shows a live TV distribution system featuring a hybrid multicast switch according to one embodiment.

Disclosed is a hybrid multicast switch that, while implemented as a data-link-layer hardware device, implements selected features to enable the switch to perform selected multicast functions. FIG. 2 shows a live TV distribution system 200 featuring a hybrid multicast switch 206 according to one embodiment.

Although in the described embodiments, the elements of hybrid multicast switch 206 are presented in one arrangement, other embodiments may feature other arrangements, as will be apparent based on the disclosure and teachings provided herein. And while various embodiments are described with respect to live TV distribution, they are equally applicable to distribution of other sorts of video and data.

Referring to FIG. 2, a TV server 202 provides multiple TV channels to a network 204, and hybrid multicast switch 206 provides the TV channels to clients 208A-N on request. Hybrid multicast switch 206 includes a plurality of ports 210A-210N, a forwarding engine 212, a processor 214, and a memory 216. Forwarding engine 212 exchanges packets of data at wire speed between ports 210 according to the contents of forwarding tables 224 stored in memory 216. Processor 214 can execute a computer program stored in memory 216, and can modify forwarding tables 224 as needed. Each client 208 can include multiple devices for reception of the TV channels. For example, client 208A includes a TV set 218 connected to a set-top box 220 and a personal computer 222.

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows.

Figure 3:
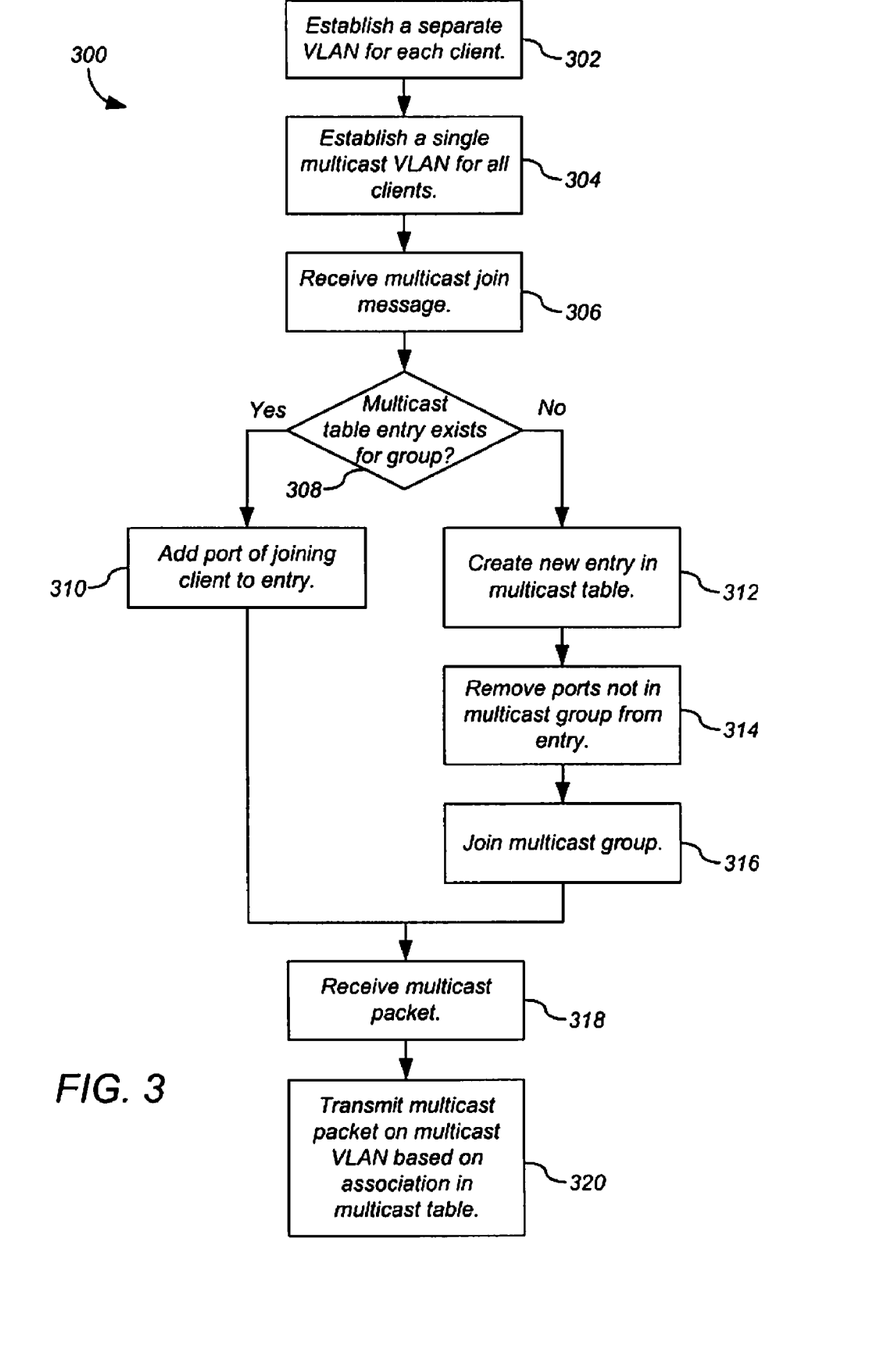
FIG. 3 shows a process for the hybrid multicast switch of FIG. 2 according to one embodiment.

FIG. 3 shows a process 300 for hybrid multicast switch 206 of FIG. 2 according to one embodiment. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIG. 3, a separate virtual local-area network (VLAN) is established for each client 208 (step 302). For example, referring again to FIG. 2, a VLAN 226A is established for client 208A and a VLAN 226N is established for client 208N. VLAN 226A includes the port 210B of hybrid multicast switch 206 to which client 208A is attached, as well as the port 210A to which network 104 is attached. Similarly, VLAN 226N includes the port 210N of hybrid multicast switch 206 to which client 208N is attached, as well as the port 210A to which network 104 is attached.

In addition, a single "multicast VLAN" 228 is established for all clients 208 (step 304). Multicast VLAN 228 includes all of the ports 210B-210N to which a client 208 is attached, as well as the port 210A to which network 104 is attached. Multicast VLAN 228 is used only for sending traffic towards clients 208. Hybrid multicast switch 206 drops any traffic received from a client 208 on multicast VLAN 228. VLANs 226 and 228 can be established by a provider of hybrid multicast switch 206.

TV server 202 establishes a multicast group for each TV channel offered. When a user selects a TV channel, his client 208 sends a multicast join message representing a request to join the multicast group corresponding to the selected channel. For example, referring again to FIG. 2, when a user of client 208A selects the TV channel using TV set 218, set-top box 220 sends the multicast join message to hybrid multicast switch 206. The multicast join message can be an Internet Group Management Protocol (IGMP) message.

Hybrid multicast switch 206 receives the multicast join message on the VLAN 226 for the port 210 attached to the client 208 sending the multicast join message (step 306). For example, when the multicast join message is sent by client 208B, hybrid multicast switch 206 receives the multicast join message on port 210B in VLAN 226B.

Processor 214 determines whether any other clients 208 belong to the requested multicast group (step 308). For example, memory 216 can store a multicast table 230 that lists each multicast address in one column and the ports 210 belonging to each multicast group in another column. If an entry already exists for the multicast group, then a client 208 attached to hybrid multicast switch 206 is a member of the requested multicast group, and is receiving the corresponding TV channel. In that case, processor 214 adds the port 210 of the client 208 joining the multicast group to the entry (step 310).

But if no clients 208 belong to the requested multicast group, processor 214 creates an association between the multicast group and the ports 210 associated with multicast VLAN 228 based on the multicast join message. For example, if no entry exists for the multicast group in multicast table 230, processor 214 creates a new entry for the multicast group in multicast table 230, and adds all of the ports 210 in VLAN 228 to the entry (step 312). In some embodiments, processor 214 then removes, from the entry, any ports 210 that do not currently belong to the multicast group (step 314). This optimization ensures that clients 208 that have not selected a channel do not receive that channel. Hybrid multicast switch 206 then joins the multicast group (step 316).

In some embodiments, hybrid multicast switch 206 joins the multicast group by transmitting one or more network-layer routing protocol messages to network 204 from port 210A. The network-layer routing protocols can include Protocol Independent Multicast (PIM), Distance Vector Multicast Routing Protocol (DVMRP), and the like. In response to the network-layer routing protocol messages, network 204 establishes a path for delivering the multicast packets of the multicast group to hybrid multicast switch 206.

In other embodiments, hybrid multicast switch 206 joins the multicast group by acting as a multicast join proxy. In these embodiments, hybrid multicast switch 206 generates a second multicast join message representing a request to join the multicast group, which has as a return address an address of hybrid multicast switch 206, and transmits the second multicast join message to network 204 from port 210A. In response to the network-layer routing protocol messages, network 204 establishes a path for delivering the multicast packets of the multicast group to hybrid multicast switch 206. Each multicast join message sent by hybrid switch 206 can request to join multiple multicast groups, for example when hybrid switch 206 receives multiple multicast join messages from clients 208 at the same time.

When hybrid multicast switch 206 receives a multicast packet for the multicast group from network 204 (step 318), forwarding engine 212 transmits the multicast packet on multicast VLAN 228 based on the association in multicast table 230 (step 320). That is, forwarding engine 212 sends the multicast packet on multicast VLAN 228 to all of the ports in the multicast table 230 entry for the multicast group (step 320). This transmission delivers the requested TV channel to the client(s) 208 requesting that channel.

Figure 4:
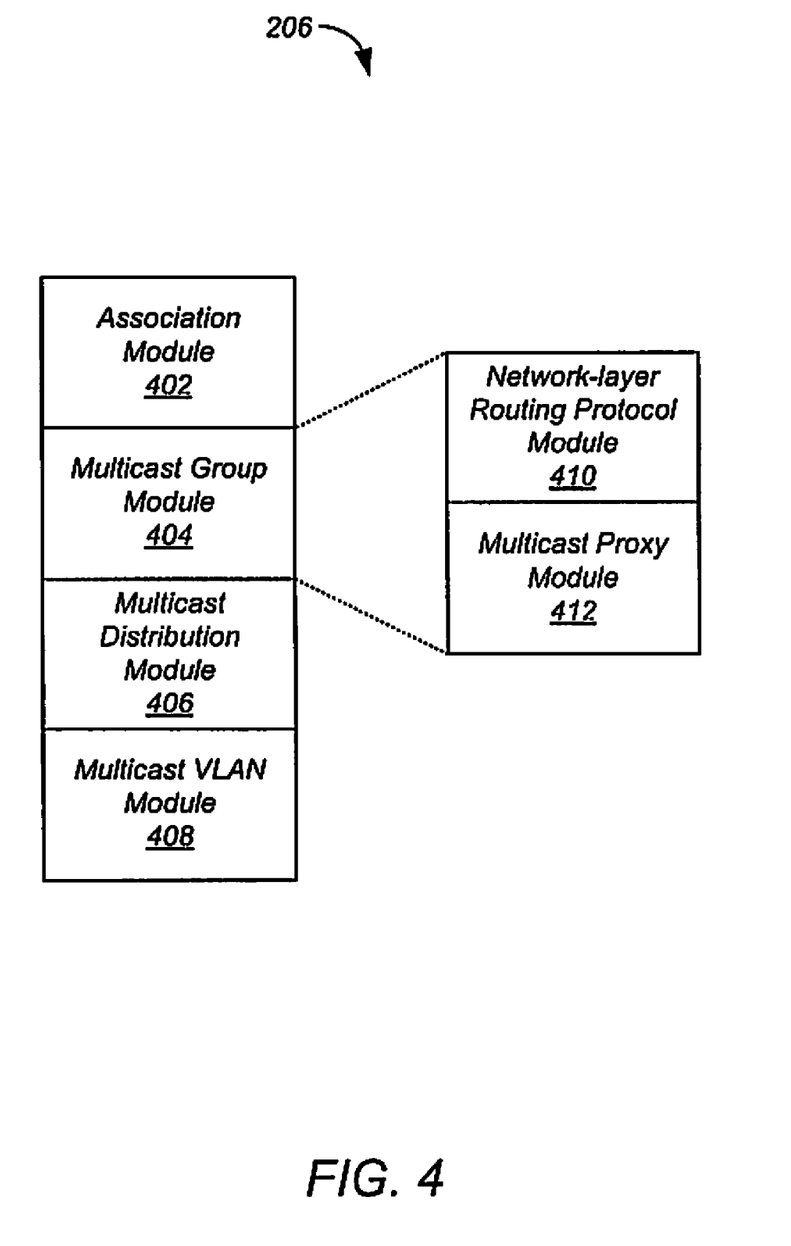
FIG. 4 shows hardware modules that can be included in the hybrid multicast switch of FIG. 2 to implement functions of the process of FIG. 3 according to one embodiment.

In some embodiments, some or all of the functions of process 300 are implemented in hardware. FIG. 4 shows hardware modules that can be included in hybrid multicast switch 206 to implement those functions according to one embodiment. Referring to FIG. 4, hybrid multicast switch 206 can include an association module 402 adapted to create the associations between multicast groups and ports 210 associated with multicast VLAN 228 based on the multicast join messages received from clients 208; a multicast group module 404 adapted to join multicast groups; a multicast distribution module 406 adapted to cause transmission on multicast VLAN 228, based on the associations, of multicast packets received from network 204; and a multicast VLAN module 408 adapted to cause traffic received from clients 208 on multicast VLAN 228 to be dropped. In some embodiments, multicast group module 404 includes a network-layer routing protocol module 410 adapted to transmit network-layer routing protocol messages to network 204. In other embodiments, multicast group module 404 includes a multicast proxy module 412 adapted to transmit multicast join messages to network 204 based on multicast join messages received from clients 208.

Embodiments of the invention can be implemented in digital electronic circuitry, or in computer hardware that executes software and/or firmware, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such an EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A method for a switch having a plurality of ports including a first port, a second port, and a third port, the method comprising:
   establishing a first virtual local-area network (VLAN) including the first port that communicates with a network and the second port that communicates with a first client;
   establishing a second VLAN including the first port and the third port that communicates with a second client;
   establishing a multicast VLAN including the plurality of ports;
   receiving a multicast join message representing a request to join a multicast group from the first client into the second port;
   creating an association between the multicast group and the plurality of ports associated with the multicast VLAN based on the multicast join message;
   creating an entry for the multicast group in a multicast table, the entry including the plurality of ports;
   removing the third port included in the second and multicast VLANs from the entry in the multicast table without receiving a message to leave the association when the second client attached to the third port is not associated with the multicast group, the third port being unavailable to receive or forward packets subsequent to the removing;
   joining the multicast group by transmitting a network-layer routing protocol message to the network from the first port;
   receiving a multicast packet for the multicast group from the network into the first port; and
   transmitting the multicast packet on the multicast VLAN based on the association.

2. The method of claim 1, further comprising:
   dropping traffic received, from the first and second clients, by the second and third ports on the multicast VLAN.

3. The method of claim 1, wherein the network-layer routing protocol is a Distance Vector Multicast Routing Protocol (DVMRP).

4. The method of claim 1:
   wherein the multicast join message is an Internet Group Management Protocol (IGMP) message.

5. The method of claim 1, further comprising:
   establishing the multicast group at a server communicating with the network;
   receiving the multicast packet from the server; and
   transmitting the network-layer routing protocol message to the server.

6. A non-transitory computer readable medium storing a computer program executable by a processor, for a switch having a plurality of ports including a first port, a second port, and a third port, the computer program comprising:
   instructions for establishing a first virtual local-area network (VLAN) including the first port that communicates with a network and the second port that communicates with a first client;
   instructions for establishing a second VLAN including the first port and the third port that communicates with a second client;
   instructions for establishing a multicast VLAN including the plurality of ports;
   instructions for receiving a multicast join message representing a request to join a multicast group from the first client into the second port;
   instructions for creating an association between the multicast group and the plurality of ports associated with the multicast VLAN based on the multicast join message;
   instructions for creating an entry for the multicast group in a multicast table, the entry including the plurality of ports;
   instructions for removing the third port included in the second and multicast VLANs from the entry in the multicast table without receiving a message to leave the association when the second client attached to the third port is not associated with the multicast group the third port being unavailable to receive or forward packets subsequent to the removing;
   instructions for joining the multicast group by causing transmission of a network-layer routing protocol message to the network from the first port;
   instructions for receiving a multicast packet for the multicast group from the network into the first port; and
   instructions for causing transmission of the multicast packet on the multicast VLAN based on the association.

7. The non-transitory computer readable medium of claim 6, further comprising:
   instructions for causing traffic received from the first and second clients into the second and third ports on the multicast VLAN to be dropped.

8. The non-transitory computer readable medium of claim 6, wherein the network-layer routing protocol is a Distance Vector Multicast Routing Protocol (DVMRP).

9. The non-transitory computer readable medium of claim 6:
   wherein the multicast join message is an Internet Group Management Protocol (IGMP) message.

10. The non-transitory computer readable medium of claim 6, further comprising:
    instructions for receiving the multicast packet from a server that communicates with the network and that establishes the multicast group; and
    instructions for transmitting the network-layer routing protocol message to the server.

11. An apparatus for managing a switch having a plurality of ports including a first port, a second port, and a third port, the apparatus comprising:
    a processor configured to establish a first virtual local-area network (VLAN) including the first port that communicates with a network and the second port that communicates with a first client, a second VLAN including the first port and the third port that communicates with a second client, and a multicast VLAN including the plurality of ports;
    an association circuit configured to receive a multicast join message representing a request to join a multicast group from the first client into the second port and to create an association between the multicast group and the plurality of ports associated with the multicast VLAN based on the multicast join message;

a network-layer routing protocol circuit configured to transmit a network-layer routing protocol message to the network from the first port to join the multicast group; and a multicast distribution circuit configured to cause transmission on the multicast VLAN, based on the association, of multicast packets received for the multicast group from the network into the first port, wherein the processor is configured to create an entry for the multicast group in a multicast table, the entry including the plurality of ports, and to remove the third port included in the second and multicast VLANs from the entry in the multicast table without receiving a message to leave the association when the second client attached to the third port is not associated with the multicast group, the third port being unavailable to receive or forward packets subsequent to the removing.

12. The apparatus of claim 11, further comprising:
a multicast VLAN circuit configured to cause traffic received from the first and second clients into the second and third ports on the multicast VLAN to be dropped.

13. The apparatus of claim 11, wherein the network-layer routing protocol is a Distance Vector Multicast Routing Protocol (DVMRP).

14. The apparatus of claim 11:
wherein the multicast join message is an Internet Group Management Protocol (IGMP) message.

15. The apparatus of claim 11, wherein:
the first port receives the multicast packets from a server that communicates with the network and that establishes the multicast group; and
the network-layer routing protocol circuit is configured to transmit the network-layer routing protocol message.

16. A method for a switch having a plurality of ports including a first port, a second port, and a third port, the method comprising:
establishing a first virtual local-area network (VLAN) including the first port that communicates with a network and the second port that communicates with a first client;
establishing a second VLAN including the first port and the third port that communicates with a second client;
establishing a multicast VLAN including the plurality of ports;
receiving a first multicast join message representing a first request to join a multicast group into the second port;
creating an association between the multicast group and the plurality of ports associated with the multicast VLAN based on the first multicast join message;
creating an entry for the multicast group in a multicast table, the entry including the plurality of ports;
removing the third port included in the second and multicast VLANs from the entry in the multicast table without receiving a message to leave the association when the second client attached to the third port is not associated with the multicast group, the third port being unavailable to receive or forward packets subsequent to the removing;
joining the multicast group by transmitting a second multicast join message representing a second request to join the multicast group to the network from the first port;
receiving a multicast packet for the multicast group from the network into the first port; and
transmitting the multicast packet on the multicast VLAN based on the association.

17. The method of claim 16, further comprising:
dropping traffic received, from the first and second clients, by the second and third ports on the multicast VLAN.

18. The method of claim 16:
wherein the first and second multicast join messages are Internet Group Management Protocol (IGMP) messages.

19. The method of claim 16, further comprising:
establishing the multicast group at a server communicating with the network;
receiving the multicast packet from the server; and
transmitting the second multicast join message to the server.

20. The method of claim 16, further comprising:
including an address of the switch as a return address in the second multicast join message.

21. A non-transitory computer readable medium storing a computer program executable by a processor, for a switch having a plurality of ports including a first port, a second port, and a third port, the computer program comprising:
instructions for establishing a first virtual local-area network (VLAN) including the first port that communicates with a network and the second port that communicates with a first client;
instructions for establishing a second VLAN including the first port and the third port that communicates with a second client;
instructions for establishing a multicast VLAN including the plurality of ports;
instructions for receiving a first multicast join message representing a first request to join a multicast group into the second port;
instructions for creating an association between the multicast group and the plurality of ports associated with the multicast VLAN based on the first multicast join message;
instructions for creating an entry for the multicast group in a multicast table, the entry including the plurality of ports;
instructions for removing the third port included in the second and multicast VLANs from the entry in the multicast table without receiving a message to leave the association when the second client attached to the third port is not associated with the multicast group the third port being unavailable to receive or forward packets subsequent to the removing;
instructions for joining the multicast group by causing transmission of a second multicast join message representing a second request to join the multicast group to the network from the first port;
instructions for receiving a multicast packet for the multicast group from the network into the first port; and
instructions for causing transmission of the multicast packet on the multicast VLAN based on the association.

22. The non-transitory computer readable medium of claim 21, further comprising:
instructions for causing traffic received from the first and second clients into the second and third ports on the multicast VLAN to be dropped.

23. The non-transitory computer readable medium of claim 21:
wherein the first and second multicast join messages are Internet Group Management Protocol (IGMP) messages.

24. The non-transitory computer readable medium of claim 21, further comprising:

instructions for receiving the multicast packet from a server that communicates with the network and that establishes the multicast group; and instructions for transmitting the second multicast join message to the server.

25. The non-transitory computer readable medium of claim 21, further comprising:

instructions for including an address of the switch as a return address in the second multicast join message.

26. An apparatus for managing a switch having a plurality of ports including a first port, a second port, and a third port, the apparatus comprising:

a processor configured to establish a first virtual local-area network (VLAN) including the first port that communicates with a network and the second port that communicates with a first client, a second VLAN including the first port and the third port that communicates with a second client, and a multicast VLAN including the plurality of ports;

an association circuit configured to receive a first multicast join message representing a first request to join a multicast group from the first client into the second port and to create an association between the multicast group and the plurality of ports associated with the multicast VLAN based on the first multicast join message;

a multicast proxy circuit configured to transmit a second multicast join message representing a second request to join the multicast group to the network from the first port; and a multicast distribution circuit configured to cause transmission on the multicast VLAN, based on the association, of multicast packets received for the multicast group from the network into the first port, wherein the processor is configured to create an entry for the multicast group in a multicast table, the entry including the plurality of ports, and to remove the third port included in the second and multicast VLANs from the entry in the multicast table without receiving a message to leave the association when the second client attached to the third port is not associated with the multicast group, the third port being unavailable to receive or forward packets subsequent to the removing.

27. The apparatus of claim 26, further comprising:

a multicast VLAN circuit configured to cause traffic received from the first and second clients into the second and third ports on the multicast VLAN to be dropped.

28. The apparatus of claim 26:

wherein the first and second multicast join messages are Internet Group Management Protocol (IGMP) messages.

29. The apparatus of claim 26, wherein:

the first port receives the multicast packets from a server that communicates with the network and that establishes the multicast group; and the multicast proxy circuit is configured to transmit the second multicast join message.

30. The apparatus of claim 26, wherein:

the multicast proxy circuit is configured to include an address of the switch as a return address in the second multicast join message.

* * * * *

UNITED STATES PATENT AND TRADEMARK OFFICE
CERTIFICATE OF CORRECTION

PATENT NO. : 8,238,337 B1
APPLICATION NO. : 12/062036
DATED : August 7, 2012
INVENTOR(S) : Michael Orr et al.

Page 1 of 1

It is certified that error appears in the above-identified patent and that said Letters Patent is hereby corrected as shown below:

Title page, item [73] under "Assignee:," delete "Isreal" and insert --Israel-- therefor.

Signed and Sealed this
Fourth Day of September, 2012

David J. Kappos
*Director of the United States Patent and Trademark Office*